May 17, 1955  R. M. ULRICH  2,708,526
ATTACHMENT FOR CRAWLER TYPE TRACTOR
Filed July 16, 1952  4 Sheets-Sheet 1
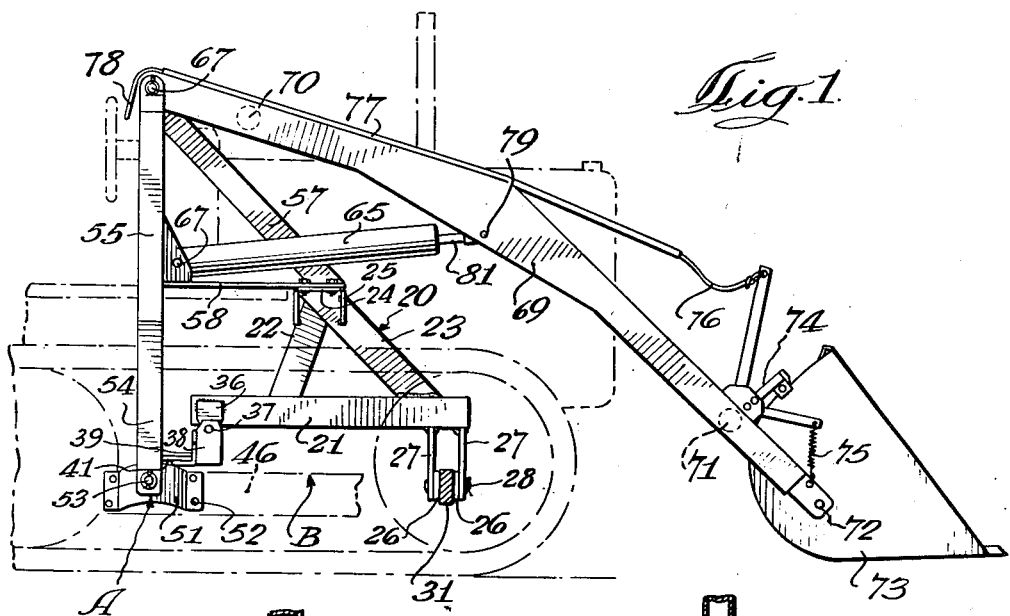
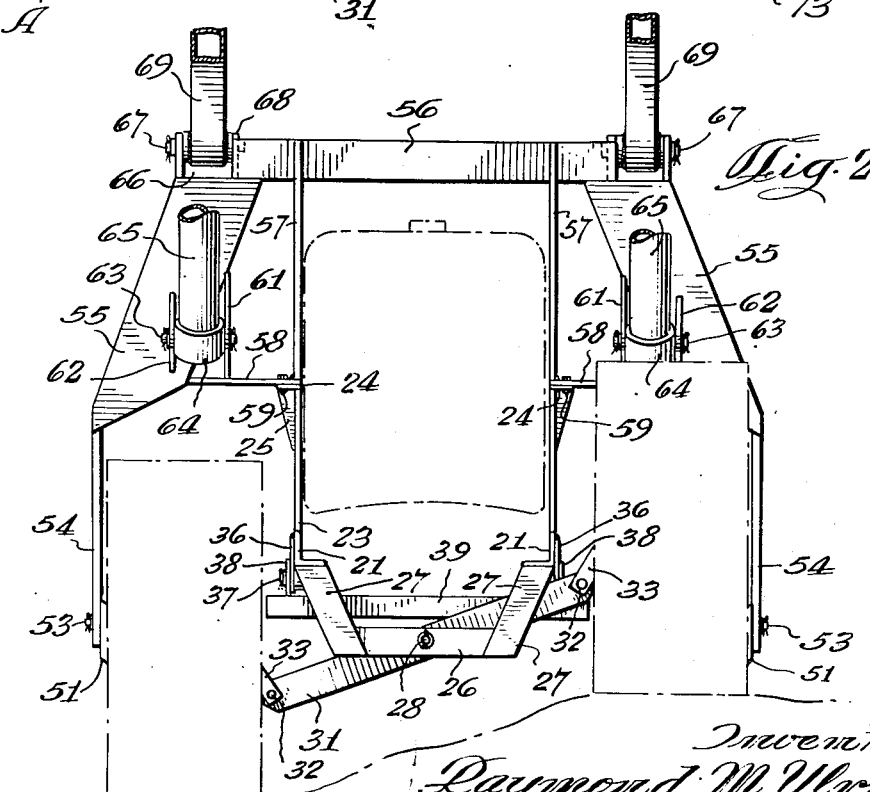
Inventor
Raymond M. Ulrich
By Alois W. Graf
Attorney

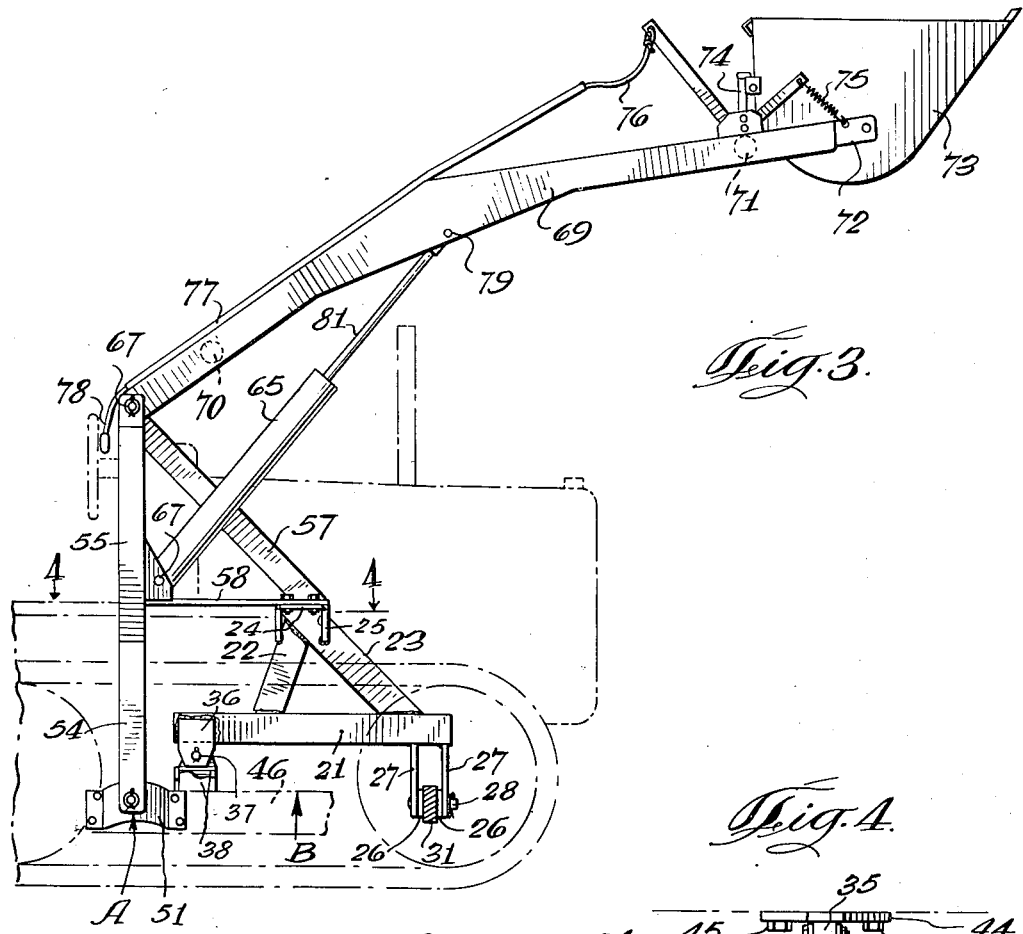
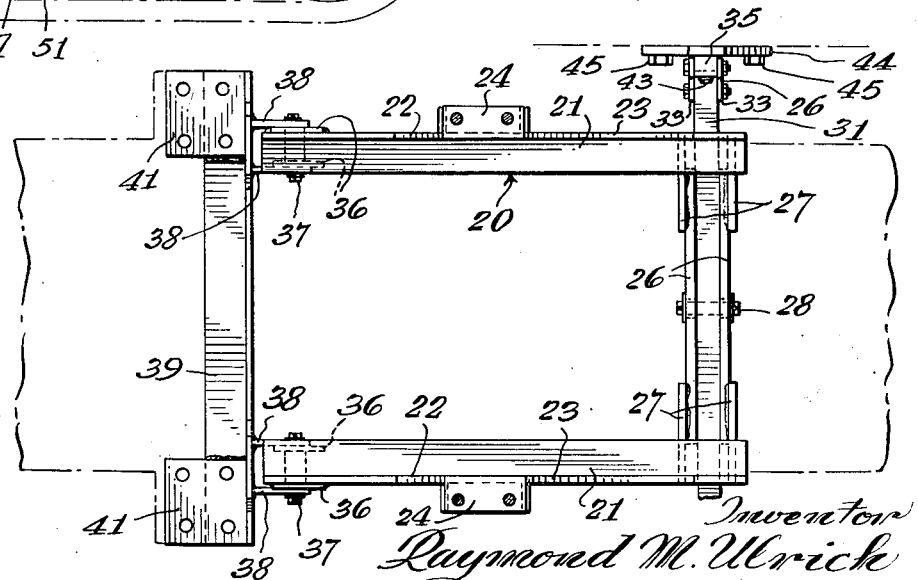

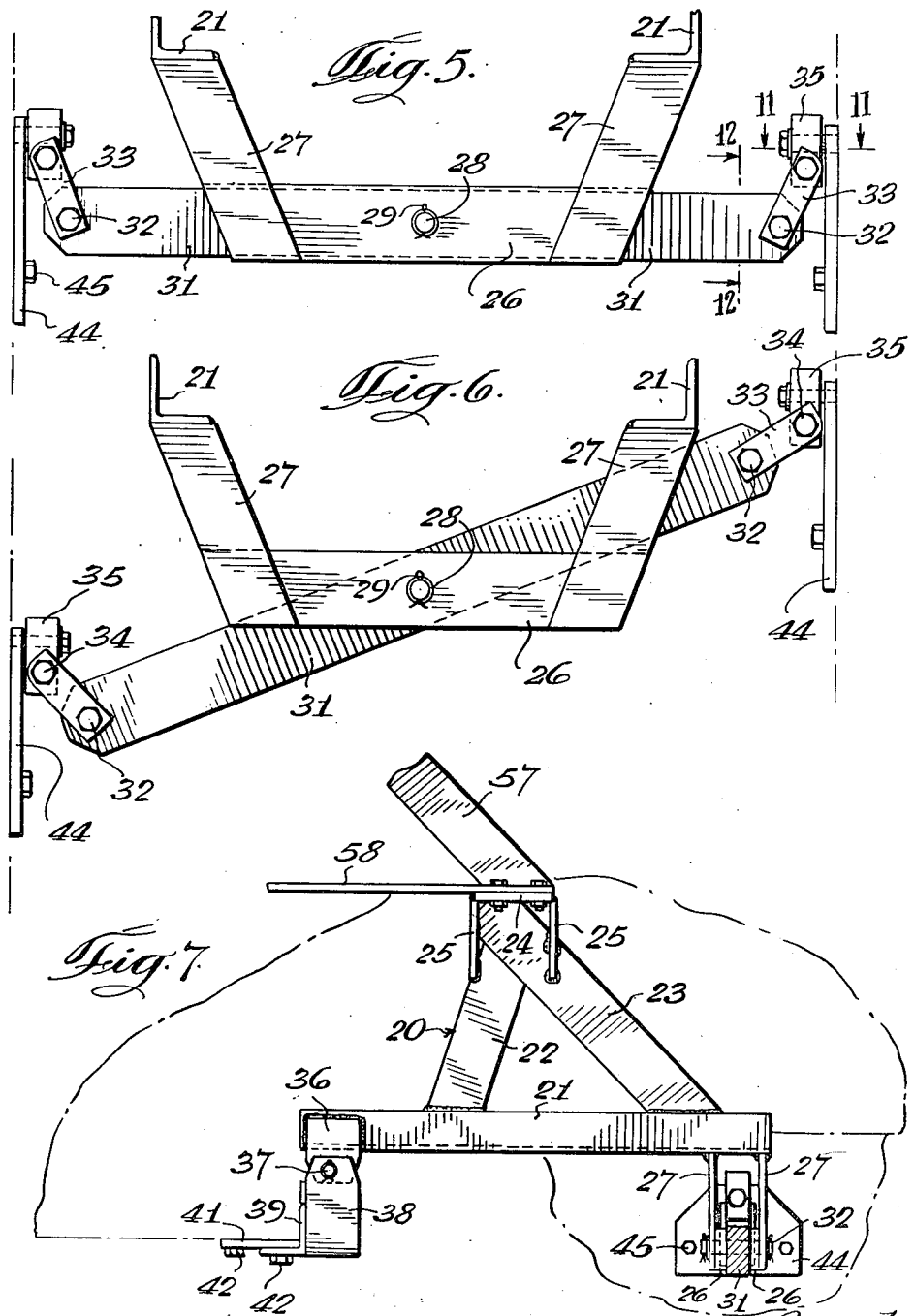

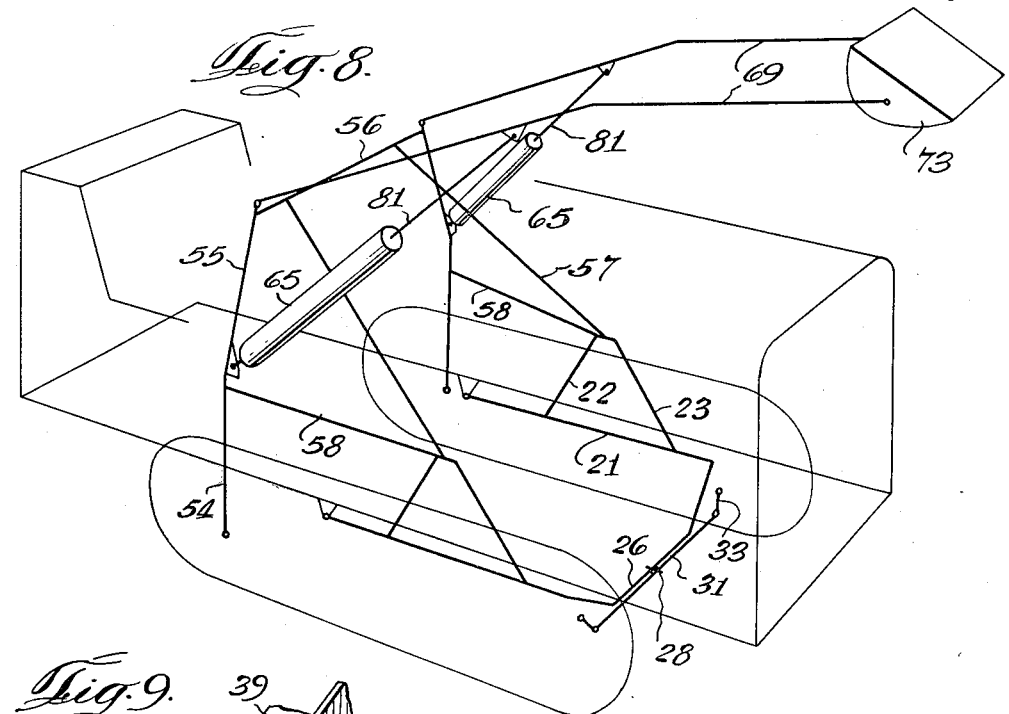
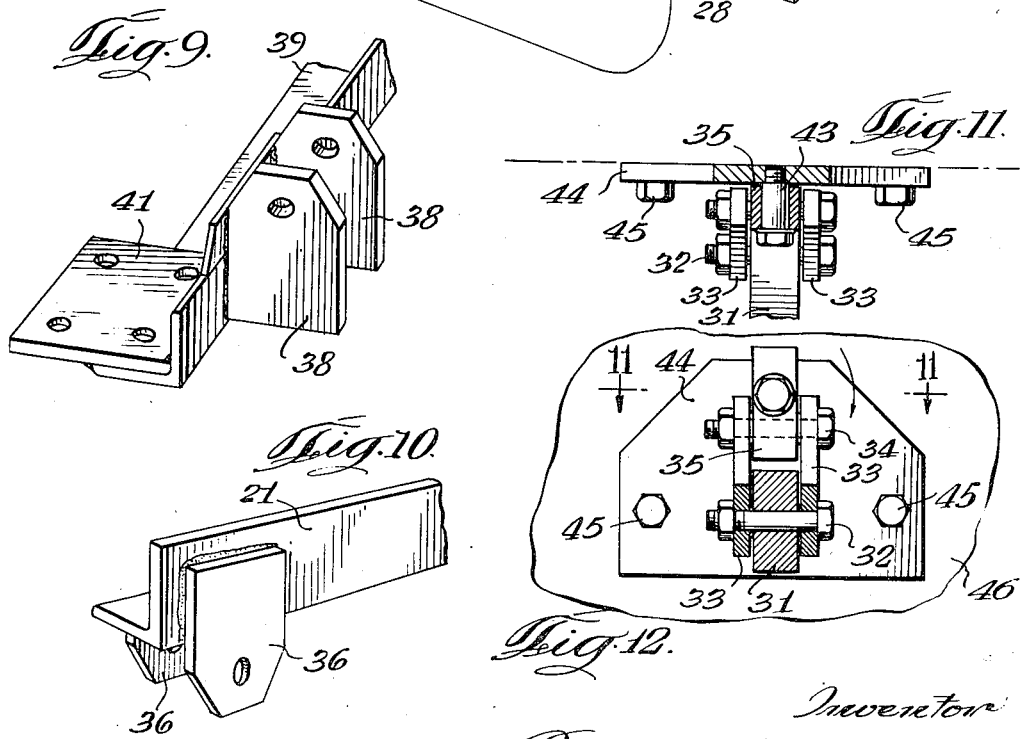

United States Patent Office 2,708,526
Patented May 17, 1955

2,708,526

ATTACHMENT FOR CRAWLER TYPE TRACTOR

Raymond M. Ulrich, Roanoke, Ill., assignor to Ulrich Foundation, Inc., a corporation of Delaware Application July 16, 1952, Serial No. 299,069

3 Claims. (Cl. 214—140)

The present invention relates to an attachment for a crawler or track type tractor, and more particularly to an attachment adapted to support equipment such as a shovel loader.

While it has been common to mount various devices on crawler or track tractors of the industrial sizes, it has not been found practicable to mount equipment on crawler or track tractors of the smaller or farm size. It, of course, is well known that the industrial sizes of such tractors have been equipped with bulldozer blades, scrapers and other equipment. The industrial size tractors have a track length appreciably greater than the track length used by farm tractors. Because of the short track on farm tractors, the track moves through an appreciable arc as the track passes over an obstacle or ground of higher elevation. The problem of providing a support for equipment to be attached to such tractor arises from the fact that no mounting members may be secured to the engine. Any attempt to mount the equipment on the crawler track must be accomplished without reducing the freedom or motion of the track.

In accordance with the present invention a mounting member has been devised which is supported at its forward portion by the crawler track support and at its rearward portion by the axle of the tractor. Thus the side of the frame and any member carried thereby places no strain upon the engine, housing or frame.

It is, therefore, an object of the present invention to provide a new and improved mounting for track type tractors for supporting loaders or any other accessories.

A further object of the invention is to provide an improved loader for track type tractors of the farm size.

Other and further objects of the present invention subsequently will become apparent by reference to the following description taken in conjunction with the accompanying drawings wherein:

Figure 1 is a side view of a crawler or track type tractor loader constructed in accordance with the present invention;

Figure 2 is a front view of the mounting and loader of Figure 1 showing the relationship of the parts where one track is passing over an obstruction or earth of higher elevation than the other track;

Figure 3 is a side view of the loader shown in Figure 1 in elevated position;

Figure 4 is a view of the mounting for the loader as seen in the direction of the arrows along the line 4—4 of Figure 3;

Figure 5 is an enlarged front view of the under carriage or mounting support frame when both tracks are on level ground;

Figure 6 is a view similar to Figure 5 when one track is higher than the other as is the case in Figure 2;

Figure 7 is a detailed side view of the mounting frame;

Figure 8 is a diagrammatic view to illustrate the relative positions of the mounting frame and the loader components relative to the tractor;

Figure 9 is a detailed partial perspective view of the rear mounting member;

Figure 10 is a detailed partial perspective view of the member which cooperates with the mounting member of Figure 9;

Figure 11 is a top view of the front mounting member as seen in the direction of the arrows along the line 11—11 in Figures 5 and 12; and Figure 12 is a detailed side view of the mounting member shown in Figure 11 and also as seen in the direction of the arrows along the line 12—12 of Figure 5.

For clarity in disclosure the farm tractor has been shown in dotted lines and the present invention in solid lines. Referring to Figures 1 to 7 attention is first directed to the mounting member which carries the tractor loader. This mounting member 20 consists of a quadrangular frame having two similar L shaped side members 21 each of which has extending upwardly two side members 22 and 23 which are welded to a horizontal apertured plate 24 by a plurality of gussets 25.

The frame and the two side members 21 are connected to two parallel transverse plates 26 each connected at their ends by inclined plate members 27. The two plates 26 have a central aperture which carries a pivoted member or bolt 28 which may be retained in position by a cotter key 29. The pin or bolt 28 passes through the central opening in a transverse bar 31. Each end of the transverse bar 31 is apertured to receive a pin or bolt 32 which passes through a pair of links 33 connected by a bolt 34 to a support member 35 shown in greater detail in Figures 11 and 12.

Each of the side members 21 at its rear carries a pair of depending apertured plates 36 shown in detail in Figure 10. The apertured plates 36 are connected by a pin 37 to parallel support members 38 shown in detail in Figure 9. The support members 38 are arranged perpendicular to a transversely extending L shaped member 39. The L shaped member 39 at each end carries an apertured plate 41 which is secured by a plurality of bolts 42 to the underside of the axle housing of the tractor transmission.

Reference may now be had to Figures 11 and 12 for the details of the mounting members which support the members 35. It will be noted that the members 35 are pivotally supported by a bolt 43 which extends into a tapped hole in a plate 44. The plate 44 is secured by a plurality of bolts 45 to the inside track member 46 which extends from the pivotal point of the track to the forward idler wheel of the track. This member 46 pivots about the rear axle of the tractor which is just to the rear of the transverse member 39.

Before describing the loader which is carried by the mounting frame thus far explained it is believed preferable to elaborate on the operation of this mounting frame. Each of the tracks of the tractor pivot about the point A shown in Figures 1 and 3. Thus this pivoting takes place about that point when an operation is encountered such as that shown in Figures 2 and 6. The tractor engine is carried by the rear axle housing which is pivoted about the point A and by a transverse spring which extends from side to side at about the point B shown in Figures 1 and 3. Thus when the track seen to the right of Figure 2 passes over an obstruction the transverse spring tends to raise the engine frame above the level at which it previously was. Viewed another way it might be stated that when the track to the right of Figure 2 goes up, the track to the left of Figure 2 goes down a proportional amount relative to a horizontal line passing beneath the tractor through the extremities of the transverse spring when both tracks are on level ground. When this occurs the transverse member 31 pivotally carried by the pin 28 and the front of the support 20 moves to the position shown in Figure 6. The links 33 at each end permit this movement. The pivotal connections to the members 35 accommodate the relatively small movement of the member 46 of the track about the pivotal point A. Thus it will be seen that the frame 20 is so supported so as to tend to hold the members 21 parallel to the frame of the engine of the tractor. There is no substantial movement of the rear end of the frame member 21 with respect to the axle housing, although pins 37 have been provided. The pins 37 primarily serve as a simple and convenient means for rapidly disconnecting the frame 20 from the tractor should this be desired.

To disconnect the frame 20 from the tractor it is merely necessary to remove the two pins 37 and the two pins 34. In order to remove this frame together with the loader it is necessary only to remove two other pins subsequently to be described.

While the frame 20 has been shown in the drawings to be provided for carrying a shovel mechanism on a farm tractor, it will be appreciated that a frame of this kind may be used to support other equipment on the tractor such as for example a corn picker attachment.

Reference may now be had to Figures 1, 2, 3 and 7 for a description of the loader attachment for the farm tractor. On each of the outer side track rails or supporting members 46 there is provided an attachment support 51 which is secured to the outer member 46 by a plurality of bolts 52. It extends outwardly a distance to clear the end of the shaft which drives the track mechanism and likewise a distance sufficient that the upright member of the frame which carries the shovel will clear the tractor track. The member 51 carries a pin or bolt 53 which engages a vertical member 54. The vertical member is connected to an inwardly inclined box like structure 55 connected at its top to a transverse box shaped member 56. From the transverse box shaped member 56 two similar flat members 57 extend forwardly at an angle to a horizontal plate 58 which is connected by a plurality of bolts 59 to the support brackets 24 so as to clear the sides of the tractor engine. The horizontal members 58 extend rearwardly to the box like structure 55. A plate 61 suitably apertured extends between the horizontal plate 58 and the inside edge of the box like structure 55. The box like structure also carries a forwardly projecting apertured plate 62. A bolt 63 passes through the two plates 61 and 62 and through the pivotal end 64 of a hydraulic cylinder and piston.

The horizontal box like structure 56 has formed adjacent each end a recess 66. A bolt 67 passes through the end of the box like structure 56 and an inner plate 68 forming a part of the box like structure 56. A bolt 67 passes through a bearing member carried by a boom 69. The boom 69 a short distance from the pivotal pins 67 is interconnected by a transverse tubular member 70. The two boom members 69 are each box like structures connected together adjacent the outer extremities by a transverse tubular member 71. The box like structures 69 which serve as the booms have apertured ears 72 adjacent their outer extremities for pivotally supporting a shovel 73. The shovel is retained in the position shown in Figures 1 and 3 by a latching mechanism 74 biased by a spring 75 and released by a rope 76. The rope passes through a guide or tube 77 so that the end 78 is readily accessible to the tractor operator. The boom 69 at an intermediate point is connected by a pin 79 to the piston rod 81 of the hydraulic cylinder 65.

From the foregoing description of the shovel mechanism it will readily be appreciated that there has been provided an arrangement wherein a loading action on the shovel comprises a substantially horizontal force on the frame 20. This in turn is applied to the horizontal track guiding members 46. Since the supporting frame 20 is stable relative to the oscillatory motions of the track members it is apparent that the shovel 73 is maintained comparatively steady.

While for the purpose of illustrating and describing the present invention certain particular embodiments have been illustrated in the drawings, it is to be understood that the invention is not to be limited thereby since such variations and embodiments are contemplated as may be commensurate with the spirit and scope of the invention set forth in the accompanying claims.

I claim as my invention:

1. The combination for a crawler type farm tractor having a rear axle housing and endless tracks each provided with track roller bars arranged to pivot adjacent the rear end thereof comprising a U shaped rigid support frame beneath said tractor having its free end members pivotally connected to the forward side of the tractor rear axle housing, said support frame having its transverse front end pivotally connected at its center to a transverse bar, a pair of attachment members each connected to the front end of the inner side of one of said track roller bars, and means interconnecting the ends of said transverse bar with said attachment members to accommodate pivotal movement of one track roller bar in a direction opposite to the pivotal movement of the other track roller bar comprising pivotally mounted link members normally extending upwardly at an angle from said transverse bar to said attachment member.

2. The combination for a crawler farm tractor having a rear axle housing and endless tracks each provided with parallel track roller frame channels arranged to pivot adjacent the rear end, a U shaped support frame having two side members pivotally connected at one end thereof to the front side of the tractor rear axle housing in the proximity of the pivotal axis of said track frame channels, a transverse member rigidly interconnecting the remaining ends of said side members, a second transverse member pivotally connected to the transverse member of said support frame, a pair of attachment members each mounted on the inside track frame channel adjacent the front end thereof, a second support frame connected at its front end at an intermediate point on each side member of said first support frame, a pair of attachment members each mounted on the outside track frame channel at the pivotal axis thereof, said second frame having adjacent its rear downwardly extending members each pivotally connected to one of said latter attachment members, a shovel pivotally connected to the rear of said second frame, and hydraulic means carried by said second frame for actuating said shovel.

3. The combination for a crawler farm tractor having a rear axle housing and endless tracks each provided with two parallel track roller frame channels arranged to pivot adjacent the rear end thereof, a support frame located beneath the tractor engine and between said tracks and engine, said frame having a U shaped portion, the legs thereof being connected pivotally at the rear of the tractor to the forward side of the rear axle housing, a transverse member pivotally connected to the front of said U shaped frame portion, a pair of attachment members each mounted on the inside track frame channel adjacent the front end thereof, means interconnecting said attachment members with the ends of said transverse member, a second support frame connected at its front end at an intermediate point on legs of said first support frame, a pair of attachment members each mounted on the outside track frame channel adjacent the front thereof, said second frame having downwardly extending members each pivotally connected to one of said latter attachment members, a pair of lifting levers each pivotally connected at one end to the rear of said second frame, a shovel pivotally connected to the other end of said levers, and hydraulic means for actuating said shovel, said means interconnecting an intermediate point on each of said lifting levers with said second frame.

References Cited in the file of this patent

UNITED STATES PATENTS

| | | |
|---|---|---|
| 2,501,797 | Ulrich | Mar. 28, 1950 |
| 2,519,974 | Mork | Aug. 22, 1950 |
| 2,538,000 | Hoar et al. | Jan. 16, 1951 |
| 2,593,500 | Thierry | Apr. 22, 1952 |